Figure 1:
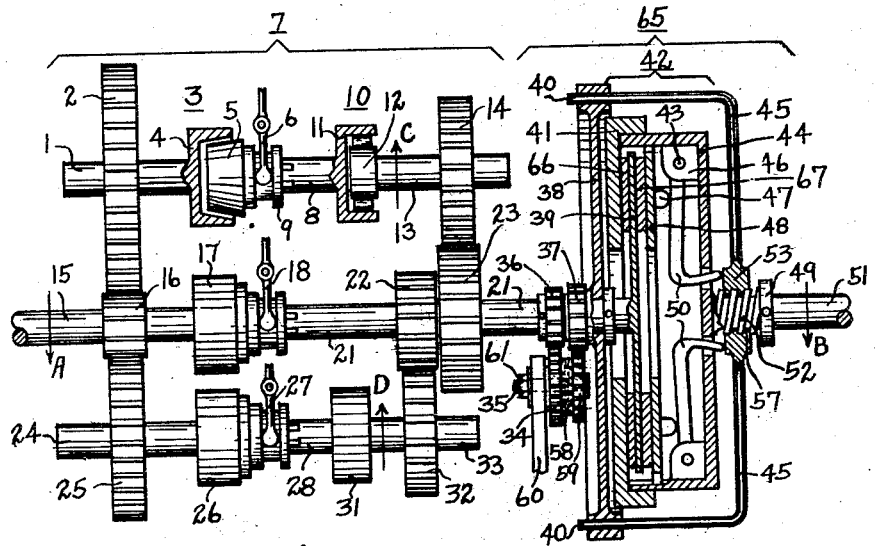

April 21, 1942.  A. V. BEDFORD  2,280,683
AUTOMATIC CLUTCH
Filed April 9, 1940

INVENTOR
Alda V. Bedford.

Patented Apr. 21, 1942

2,280,683

UNITED STATES PATENT OFFICE 2,280,683

AUTOMATIC CLUTCH

Alda V. Bedford, Collingswood, N. J.

Application April 9, 1940, Serial No. 328,613

17 Claims. (Cl. 192—54)

The present invention relates to power transmitting apparatus and more particularly to automatic clutches.

In a preferred embodiment of my invention, a multiple speed transmission system comprising a gear box and my automatic clutch is interposed between the engine and the propeller shaft of a motor vehicle. In previous types of transmission systems, it is necessary to disengage the clutch manually (or by automatic means) when the gear ratio is changed, in order to avoid producing a shock which might injure the mechanism or discomfort the passengers. When shifting is done manually, this requirement complicates the operation of a motor vehicle and results in appreciable intervals of time during which the drive is interrupted. Automatic transmission systems have previously been designed which automatically execute the shifting operations, including the releasing of the clutch in accordance with combinations of vehicle speed, torque, accelerator position, or other variables. Such automatic transmissions in general have been very complicated and have required critical adjustments of the clutch or clutches to avoid shocks and to avoid intervals during which no power is transmitted and at the same time to avoid possibility of partially locking the transmission due to being in two speed ratios simultaneously.

In the present invention, I provide means for continuously and automatically adjusting the pressure of the clutch plates to an amount just adequate to transmit the torque required to drive the vehicle with a minute amount of slip. This adjustment is such as to compensate for variable load conditions due to wind, road conditions, and normal acceleration. Contrary to usual practice, I locate the clutch between the gear box and the propeller shaft. When it is desired to change gears, the shift is made abruptly, whereupon the clutch slippage increases quickly to an amount such as to accommodate the change of gears. No shock is transmitted to the propeller shaft because the clutch is momentarily unable to transmit the greater torque. Immediately after the shift in gears is made, a clutch control member gradually accelerates, causing the clutch pressure to be readjusted gradually to the condition that will provide a minute amount of slip under the new load conditions occasioned by the new gear ratio.

The clutch pressure adjusting mechanism continually compares the output rotation of the clutch to the input rotation and adjusts the clutch pressure accordingly to provide the desired rotation ratio even though the coefficient of friction of the clutch plates should change, thereby avoiding the need for critical manual adjustment.

Accordingly, the primary object of the present invention is to provide a novel transmission and self-actuating clutch of comparatively simple, rugged, and low cost construction.

Another object is to provide an automatic clutch for a vehicle which absorbs shocks caused by shifting gears to prevent them from being transmitted to the drive wheels.

A further object is to provide an automatic clutch adaptable for use with a gear box in which gear shifting is automatic, the combination comprising an automatic transmission system.

Another object is to provide a clutch which automatically engages at a predetermined rate when the input shaft is rotated.

Another object is to provide a clutch which automatically engages when the input shaft is rotated and at a rate which can be altered and controlled manually by the operator.

Another object is to provide control for a clutch to minimize its tendency to grab or chatter.

Figures 2, 3:
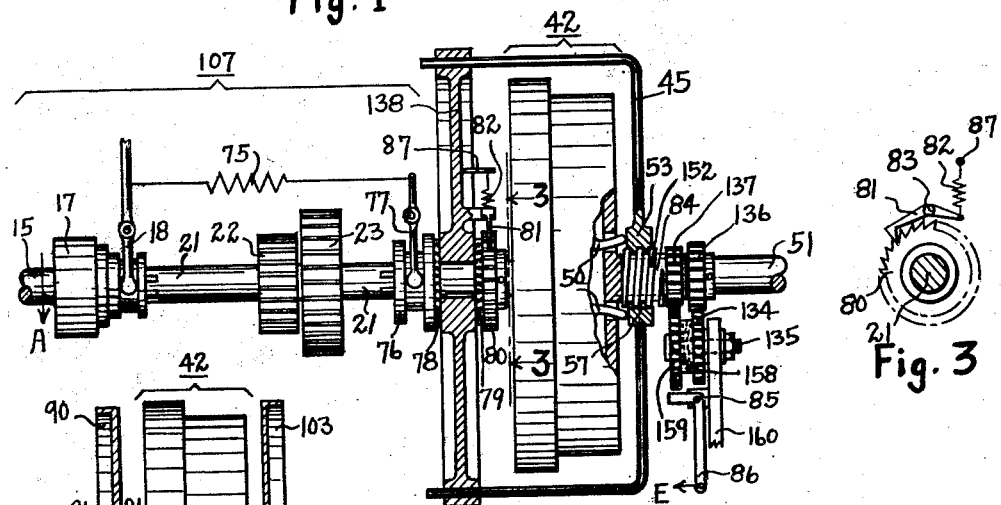
Figures 4, 5:
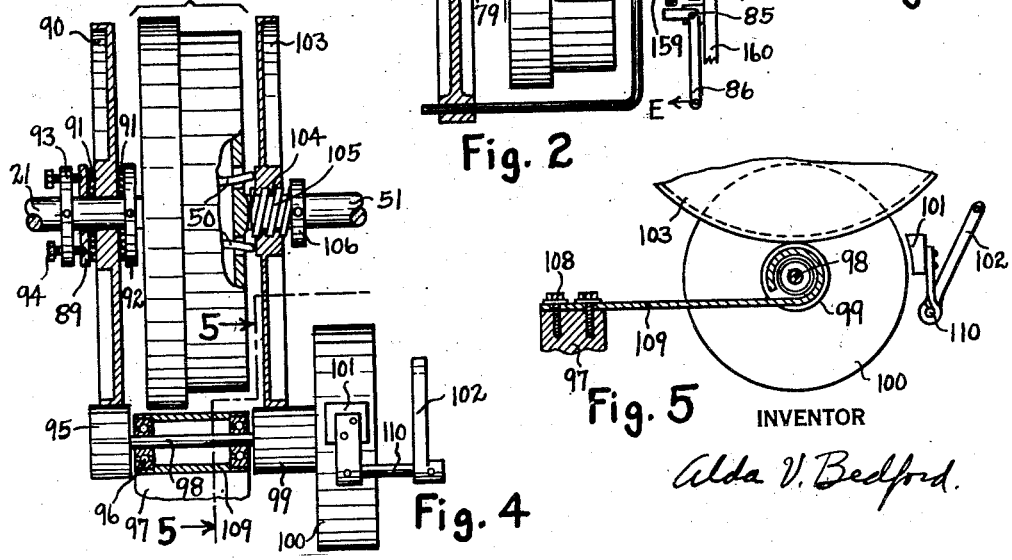

Further objects and advantages of my invention will be apparent to those skilled in the art from the following description of the preferred embodiments of the invention described with reference to the accompanying drawing wherein like numerals designate like or corresponding parts in the several views or embodiments and in which:

Fig. 1 is a view, partly in section, of the preferred embodiment of my invention as used with a gear box in a transmission system, Fig. 2 is a view, partly in section, of a second embodiment of my invention having several additional features, Fig. 3 is a detail sectional view illustrating particularly the pawl and ratchet taken on the line 3—3 of Fig. 2, looking in the direction of the arrows, Fig. 4 is a view, partly in section, of a third embodiment of my invention, and Fig. 5 is a detail sectional view illustrating particularly the method of supporting the auxiliary shaft and taken on the line 5—5 of Fig. 4, looking in the direction of the arrows.

Referring particularly to Fig. 1, numeral 15 represents an input shaft driven by a conventional internal combustion engine not shown and numeral 51 represents an output shaft by means of which the connected load is driven. Between input shaft 15 and output shaft 51 is a multiple speed transmission system comprising an automatic clutch 65 and a gear box 7 having three speed ratios, i. e., low, second, and high (direct drive). Clutch 65 and gear box 7 are connected by an intermediate shaft 21.

The gear box 7 comprises a set of gears 2, 16, 25, 14, 23, 22, and 32, three clutches 3, 17, and 26, two one-way drive clutches 10 and 31, and the usual shaft bearings and supporting case. The bearings and case are omitted from the drawing for the sake of clarity. The gears 2, 16, 25, 14, and 32 are securely fastened to their respective shafts 1, 15, 24, 13, and 33, and gears 22 and 23 are securely fastened to shaft 21. The gear 16 is in constant mesh with gears 2 and 25. Similarly, gear 23 is always in mesh with gear 14 and gear 22 is always in mesh with gear 32.

The one-way drive clutches 10 and 31 may be of the well known cam and roller type such as described in the specification and illustrated in Fig. 4 of U. S. Patent No. 2,164,086 to Mack D. Rust, or may be any other suitable type, many of which are well known in the art. Clutches 3, 17, and 26 are simple clutches such as are commonly used for abruptly making and breaking a driving connection between two shafts. Each clutch (such as clutch 3) consists of two friction members 4 and 5, a collar 9, and a yoke 6. Friction members 4 and 5 are engaged and disengaged by operation of the yoke 6 and collar 9, either manually or by automatic means, in a well known manner. Similarly, clutches 17 and 26 are engaged and disengaged by operation of the yokes 18 and 27, respectively.

Friction member 4 of clutch 3 is fastened to shaft 1 and friction member 5 is fastened to shaft 8 to which driving member 11 of one-way clutch 10 is also fastened. Driven member 12 of the one-way clutch 10 is fastened to shaft 13. Clutches 10 and 31 are arranged to drive only in the direction of the arrows C and D, respectively. Hence when clutch 3 is engaged, the engine drives intermediate shaft 21 through shaft 15, gears 16 and 2, shaft 1, clutch 3, shaft 8, one-way clutch 10, shaft 13, and gears 14 and 23. As indicated in the drawing by the relative sizes of the gears, this is the low speed drive. Similarly, when clutch 26 is engaged, the engine drives shaft 21 through shaft 15, gears 16 and 25, shaft 24, clutch 26, shaft 28, one-way clutch 31, shaft 33, and gears 32 and 22. This is the second speed drive. When clutch 17 is engaged, the engine drives shaft 21 directly through shaft 15 and clutch 17. It should be noted that, due to the use of the two one-way drive clutches 10 and 31, any one of the clutches 3, 17, and 26 may be engaged at any time, or, any two or all three of said clutches may be engaged at the same time without locking the mechanism. This allows shifting of gear ratios without interrupting the transmission of driving torque.

The automatic clutch 65 consists of the simple friction clutch 42 and the automatic control means to be described. The friction clutch 42 comprises a driving friction disc 39 securely fastened to shaft 21, a housing assembly consisting of a drum 44 and end plate 41 fastened thereto, and a driven friction disc 48 slidably splined in drum 44 in such a manner that it is axially movable relative thereto. The disc 39 is lined with suitable friction material 66 and 67. Drum 44 is securely fastened to output shaft 51. A plurality of clutch operating levers 50, pivoted on pins 43 in internal brackets 46 of housing 44, are arranged to bear on nubs 47 on friction disc 48. A small amount of pressure applied to the free ends of levers 50 will therefore cause friction member 39 to be squeezed between friction disc 48 and end plate 41 with a considerable pressure which is sufficient to transmit the driving torque between shafts 21 and 51. This construction and operation of clutches is well known to those familiar with the clutch art.

Engagement of clutch 42 is controlled by a threaded clutch control member 53 which engages the output shaft 51 by means of threads 52 cut externally on shaft 51 and cooperating threads 57 cut internally in control member 53. The direction of threads 52 and 57 is such that if control member 53 rotates faster than shaft 51 in the direction of the arrow B, member 53 will be screwed toward clutch 42, bearing against the free ends of levers 50, causing them to apply increasing pressure between friction members 48, 39, and 41. Similarly, if control member 53 rotates slower than shaft 51, member 53 will be screwed away from clutch 42, thus decreasing the pressure between members 48, 39, and 41. A collar 49 fastened to shaft 51 and the drum 44 limit the axial movement of member 53 relative to shaft 51. From the above description, it will be seen that levers 50 and nubs 47 comprise a coupling means by which the axial motion of control member 53 causes motion of friction disc 48.

Clutch control member 53 is driven by means of a plurality of arms 45 from a flywheel 38 rotatably supported on intermediate shaft 21. The ends 40 of arms 45 are free to slide in holes in the rim of flywheel 38 as required when control member 53 moves axially relative to shaft 51. Flywheel 38 is free to rotate relative to shaft 21 and is driven therefrom by a set of gears 36, 34, 59, and 37. Gear 36 is securely fastened to shaft 21 and is in constant mesh with and drives gears 34. Gear 37 is securely fastened to flywheel 38 and is always in mesh with and driven by gear 59. Gears 34 and 59 are rotatably mounted on a pin 35 supported by a bracket 60 fastened to the supporting case (not shown) of the gear box 7. Gear 34 drives gear 59 through a compressible washer 58 made of suitable friction material (such as cork). Pressure on the friction washer 58 may be adjusted by means of the nut 61 on the threaded end of pin 35.

The relative sizes of gears 36, 34, 59, and 37 are such that the rotative speed of flywheel 38 and clutch control member 53 is normally minutely slower than the speed of shaft 21. For the purpose of this description, it will be assumed that gear 36 has 31 teeth, gear 34 has 32 teeth, gear 59 has 33 teeth, and gear 37 has 32 teeth. The ratio of gear 37 to gear 36 is therefore 1023 to 1024, or in other words, the speed difference between shaft 21 and the flywheel 38 is normally about 0.1 per cent. It will be understood that in actual practice some other amount of speed difference may be used.

Gears 34 and 59, with the compressible washer 58 between them, constitute a torque-limiting device. The maximum torque transmittable between gears 34 and 59, and hence between shaft 21 and flywheel 38, is therefore determined by the pressure between the said gears and the physical properties of the friction material.

In describing the operation, it is assumed that initially the clutches 3, 17, 26, and 42 are disengaged and that the output shaft 51 is not rotating. Input shaft 15 is driven in the direction of the arrow A by a prime mover, such as an internal combustion engine. In order to start the load in low gear, clutch 3 is abruptly engaged by means of the yoke 6, causing shaft 21 to reach full low gear speed very quickly. Shaft 51 still does not rotate because clutch 42 is not yet engaged.

Although shaft 21 and gears 33 and 34 quickly reach low gear speed, flywheel 38 does not rotate at the same speed immediately because of its relatively high inertia and because of the fact that the torque transmittable to it is definitely limited by the torque-limiting device comprising gears 34 and 59 and friction washer 58. As the inertia of flywheel 38 is gradually overcome, the speed of flywheel 38 becomes almost equal to the speed of shaft 21, the final speed difference being determined by the overall ratio of gears 36, 34, 59, and 37, assumed to be 0.1 per cent. The rate of acceleration of flywheel 38 may be made as low as desired by increasing the inertia of the flywheel 38 and by decreasing the pressure on friction material 58. From the above description, it will be understood that the torque-limiting device and the flywheel 38 comprises a rotary shock-absorbing filter in that by their cooperative action they transmit the mean speed of shaft 21 to the control member 53 but do not transmit the sudden changes in speed.

Since flywheel 38 drives clutch control member 53 through arms 45, control member 53 is also accelerated at the same low rate as flywheel 38, that is to say, without serious shock or jerk. As explained previously, the rotation of control member 53 tends to cause clutch 42 to engage and thereby causes the output shaft 51 to rotate. This rotation of shaft 51 would tend to disengage clutch 42 were it not for the greater speed of control member 53 in the same direction. Since the two tendencies are opposite in effect, that is, they tend to nullify each other, adjustment of the clutch pressure ceases only when the speed of the output shaft 51 is equal to that of control member 53. For example, if output shaft 51 is slower than control member 53, the differential or net effect will be to further engage clutch 42, thereby reducing the slip and raising the speed of the output shaft 51. Conversely, if output shaft 51 is faster than control member 53 (as might obtain when the load on shaft 51 has low inertia and the input shaft 21 is suddenly decelerated as by gearshifting), the relative rotation of control member 53 and threads 52 will reduce the clutch pressure, allowing greater slipping, so that output shaft 51 will slow down. In other words, the pressure of clutch 42 will be adjusted constantly and automatically to obtain the condition that will cause the speed of output shaft 51 to be the same as that of control member 53. Hence it is evident that control member 53 is a pilot in that it controls clutch 42 such as to cause output shaft 51 to follow it in speed.

Having established the fact that the pressure of clutch 42 is regulated at all times such as to cause the speed of output shaft 51 to follow substantially the speed of control member 53, and having explained previously that control member 53 and flywheel 38 are accelerated gradually to a final speed minutely slower (assumed 0.1 per cent) than intermediate shaft 21, it is evident that within a considerable time after clutch 3 is abruptly engaged, the speed of output shaft 51 is minutely slower than the speed of intermediate shaft 21. In other words, the clutch 42 has been adjusted automatically to slip continuously an average of 0.1 per cent. Therefore, under this condition the pressure on the clutch is just barely adequate to transmit the torque required by the load.

Drive through the low gear channel including clutch 3 might continue indefinitely but generally it would soon be desirable to shift to second gear. This is done by abruptly engaging clutch 26, leaving clutch 3 engaged, thus allowing one-way drive clutch 10 to over-run, or "free-wheel," to avoid locking. Due to the high kinetic energy of the motor, shaft 21 will be driven momentarily at a considerably higher speed, but clutch 42 will immediately slip a large amount, perhaps as much as 50 per cent, even though in second gear the steady torque which the motor can provide in shaft 21 is less than in first gear. It is an important feature of the apparatus that even though the speed of shaft 21 increases suddenly when clutch 26 is engaged, no jerk or shock is transmitted to the load on shaft 51 because the pressure adjustment on clutch 42 had been previously automatically set to just transmit the torque required to drive the load at a relatively momentarily fixed speed and because a relatively long time is required to accelerate flywheel 38 through the friction washer 58 and thereby tighten up clutch 42. However, within a short time after clutch 26 is engaged, flywheel 38 will reach a speed minutely slower than the new, or second gear, speed of shaft 21. Control member 53 therefore readjusts clutch 42 until the speed difference between shafts 21 and 51 is again the same as the overall speed difference between gears 36, 34, 59, and 37 (assumed 0.1 per cent).

As to whether flywheel 38 accelerates or decelerates and as to whether the clutch 42 is tightened or loosened after the shift, depends mostly upon throttle opening of the engine. For example, if the road were smooth, the throttle opening were fixed at a moderate position, and the vehicle speed were moderate as in starting normally on an open highway, the flywheel 38 would be accelerated but not at quite as great a rate as the output shaft 51. Hence clutch 42 would be loosened. This is reasonable since the torque normally transmitted is less for second gear than for first gear. On the other hand if the throttle opening had been greatly increased immediately after shifting into second gear, the clutch 42 would have been tightened. This driving condition might occur when low gear has been used in order to obtain a very low speed instead of high torque. But the important features of the above-described operation are that a shift has been made from first to second gear without interruption of driving torque and without any jerk or shock being transmitted to the load.

Drive through the second gear channel including clutch 26 might continue indefinitely, but generally it is desirable to shift to high speed (direct drive). This is done by abruptly engaging clutch 17, leaving clutches 3 and 26 engaged, thus allowing the one-way clutches 10 and 31 to overrun, or free-wheel, to avoid locking. The operation of clutch 65 is the same for this shift as was explained for the shift from first to second gear. Thus again a shift has been made from a lower to a higher gear ratio without shock or jerk being transmitted to the load and without interruption of driving torque.

Drive in high gear may continue indefinitely, but clutch 42 will slip continuously an amount that averages 0.1 percent of the speed of the input shaft. However, when the road conditions or an increase of vehicle acceleration are such as to require increased torque, the slipping of the clutch will increase momentarily and cause a relative rotation of clutch control member 53 and output shaft 51 such as to tighten clutch 42 and restore the slip to the 0.1 per cent value.

In general, continuously slipping clutches have been undesirable in the past on account of wear and wasting of power. However, when the slip is maintained at a value as low as 0.1 per cent, which would consume only one-twentieth horsepower out of say 50 horsepower transmitted, it should not be very serious. Of course by the choice of suitable gears to drive flywheel 38 the slip could be reduced still further if desired.

If it is desired to shift into a lower gear ratio from high gear, clutch 17 may be disengaged abruptly. The speed of output shaft 51 will therefore decrease quickly, if the shaft is loaded, unless of course the engine speed is increased immediately after clutch 26 is disengaged. In either case, the amount of engagement of clutch 42 is quickly, smoothly, and automatically readjusted, if necessary, until the speed of output shaft 51 is again 0.1 per cent slower than the speed of intermediate shaft 21. The change in gear ratio from second gear to low gear is made in a similar manner by abruptly disengaging clutch 26.

If the load on output shaft 51 should decrease to zero and start to reverse, that is, if shaft 51 should tend to drive the engine (as would happen in the case of a vehicle running down hill), clutch 42 would disengage completely in an attempt to maintain the 0.1 per cent speed difference between shafts 21 and 51. The engine is therefore disconnected from the drive wheels and the vehicle is "free-wheeling." This condition will exist in the embodiment of Fig. 1 as long as the speed of output shaft 51 is greater than the speed of the engine. A means of preventing the above-described "free-wheeling" action is incorporated in another embodiment of my invention to be described later.

In order to reverse the direction of motion of the vehicle without reversing the direction of rotation of the engine, a reverse gear may be interposed between output shaft 51 and the drive wheels. The operation of my invention will be the same when the vehicle is in reverse as described above for the normal direction of motion.

Particular reference is now made to Figs. 2 and 3 illustrating the second embodiment of my invention. In the transmission system shown, input shaft 15, output shaft 51, automatic clutch 42, and other parts, are identical to the correspondingly numbered parts of the embodiment shown in Fig. 1. The gear box 107 is similar to gear box 7 of Fig. 1 except that additional control features are shown in connection with the high gear drive portion. The low and second gear portions are omitted from Fig. 2 for the sake of clarity. In this embodiment, the threads 57 cut internally in clutch control member 53 engage cooperating threads 152 cut externally on a sleeve 84 which is rotatably supported on output shaft 51. As in the first embodiment, the direction of threads 57 and 152 is such that if control member 53 rotates faster than sleeve 84, member 53 will be screwed toward clutch 42, bearing against the free ends of levers 50, causing them to increase the engagement of clutch 42 as previously described.

The sleeve 84 is free to rotate relative to shaft 51 and is driven therefrom by a set of gears 136, 134, 159 and 137. Gear 136 is securely fastened to shaft 51 and is in constant mesh with and drives gear 134. Gear 137 is securely fastened to sleeve 84 and is always in mesh with and driven by gear 159. Gears 134 and 159 are rotatably mounted on a pin 135 supported by a bracket 160 fastened to the supporting case (not shown) of gear box 107. Gear 134 drives gear 159 through a compressible washer 158 made of suitable friction material, such as cork. Pressure on the washer 158 may be adjusted by means of the nut on the threaded end of pin 135. The relative sizes of gears 136, 134, 159, and 137 are such that the rotative speed of sleeve 84 is minutely faster than the speed of shaft 51, say 0.1 per cent faster. In the description of the embodiment of Fig. 1, it was shown how a small difference in speeds can be obtained easily with a set of gears having nearly the same numbers of teeth.

Means for manually stopping the rotation of gear 159, and therefore the rotation of gear 137 and sleeve 84, is provided in the form of a brake 86 pivotally supported on a small extension of bracket 160. When the end of the brake 86 is moved in the direction of the arrow E, gear 159 is engaged and stopped from rotating. Slipping then occurs between the washer 158 and gear 159 or gear 134, or both.

Clutch control member 53 is driven by means of a plurality of arms 45 from a flywheel 138 rotatably supported on intermediate shaft 21 between an axially movable collar 76 splined to shaft 21 and a ratchet wheel 80 pinned to shaft 21. A friction washer 79 is interposed between flywheel 138 and ratchet wheel 80 and another such washer 78 is interposed between flywheel 138 and collar 76. The washers 78 and 79 are made of any suitable friction material, such as cork. Flywheel 138 is free to rotate on shaft 21 and is driven therefrom through the washers 78 and 79, which constitute a torque-limiting device. Pressure on the washers 78 and 79 is provided by a lever 77 connected by a spring 75 to the operating lever 18 of clutch 17. The arrangement is such that when clutch 17 is engaged, the pressure on washers 78 and 79 is less than when clutch 17 is not engaged. The amount of torque transmittable by the torque-limiting device is therefore less in high gear than it is in a lower gear.

In order to prevent the flywheel 138 from "over-running" the shaft 21 due to its inertia, or in other words, to make the flywheel 138 slow down in speed when the speed of shaft 21 suddenly decreases, a pawl 81 is provided to engage the teeth on ratchet wheel 80. As shown in Fig. 3, pawl 81 is pivotally mounted on a pin 83 securely fastened to flywheel 138. A spring 82 attached at one end to flywheel 138 by a pin 87 insures that the pawl 81 will maintain engagement with the ratchet teeth. At any time that flywheel 138 should tend to rotate faster than shaft 21, such as would occur if the speed of shaft 21 suddenly decreased, the engagement of pawl 81 with one of the teeth on ratchet 80 causes flywheel 138 to slow down as quickly as shaft 21.

In operation, the embodiment of Fig. 2 is similar in many respects to the embodiment of Fig. 1. In Fig. 2, control member 53 is driven from shaft 21 through the torque-limiting device consisting of collar 76, friction washer 78, and the hub of flywheel 138. The normal speed of control member 53 is therefore the same as the speed of the intermediate shaft 21. The threaded sleeve 84 is driven from the output shaft 51 through gears 136, 134, 159, and 137 at a speed which is normally slightly greater than the speed of output shaft 51. Hence the difference between embodiments of Figs. 1 and 2 is that in Fig. 2 the gears that produce a speed ratio slightly different from unity are interposed between output shaft 51 and threads 152 whereas in Fig. 1 these gears are interposed between intermediate shaft 21 and control member 53. It is obvious that the effect of gearing one of the screw members (sleeve 84 of Fig. 2) upward from the output shaft 51 is the same as gearing the cooperating screw member (control member 53 of Fig. 1) downward from intermediate shaft 21. Hence insofar as the operation has been discussed so far, the operation of the embodiment of Fig. 2 is the same as that of Fig. 1. However, Fig. 2 illustrates three additional useful modifications, as follows.

First, the torque-limiting device between shaft 21 and flywheel 138 is made adjustable in accordance with the position of the clutch operating lever 18 used in selecting high gear in gear box 107. When lever 18 is moved to engage clutch 17, the tension of spring 75 is decreased, thereby reducing the pressure on the friction washers 78 and 79. The amount of torque which may then be transmitted from shaft 21 to flywheel 138 is reduced so that the rate of engagement of clutch 42 is reduced when the gear box 107 is in high gear. This results in smoother operation at high speeds when the system is used in a vehicle, for example.

Second, the ratchet 80 and pawl 81, comprising a one-way clutch, insures that the flywheel 138 cannot run faster than shaft 21, as might otherwise occur when the speed of shaft 21 is reduced very abruptly. This feature is desirable to prevent the over-running of flywheel 138 causing clutch 42 to become engaged with excessive pressures.

Third, in connection with the discussion of Fig. 1, it was explained that "free-wheeling" of clutch 65 occurs automatically when shaft 51 is overdriven by the load itself. Though free-wheeling is sometimes desirable, there are times when, in the interest of safety, it is desirable to avoid automatic free-wheeling at the discretion of the operator. This is made possible in the embodiment of Fig. 2 by the brake 86. When the brake 86 is applied, gear 159 and sleeve 84 are locked, causing friction washer 158 to slip. Under this condition any rotation of control member 53 will cause clutch 42 to become engaged irrespective of the speed of rotation of output shaft 51.

Particular reference is now made to Figs. 4 and 5 illustrating a third embodiment of my invention. The clutch 42 is the same as the correspondingly numbered clutches in Fig. 1 and Fig. 2. The gear box is not shown in Fig. 4 but it will be understood that only the clutch portion of the transmission system differs from Figs. 1 and 2.

Engagement of clutch 42 is controlled by a clutch control disc 103 which engages the output shaft 51 by means of threads 104 cut internally in disc 103 and cooperating threads 105 cut externally on shaft 51. The direction of threads 104 and 105 is such that if disc 103 rotates faster than shaft 51, disc 103 will be screwed toward clutch 42, bearing against the free ends of levers 50, causing them to increase the engagement of clutch 42. Similarly, if disc 103 rotates slower than shaft 51, disc 103 will be screwed away from clutch 42, thus decreasing the engagement. A collar 106 fastened to shaft 51 limits the axial movement of disc 103 with respect to shaft 51.

Control disc 103 is driven frictionally by a roller 99 fastened to and supported by an auxiliary shaft 98. To the other end of shaft 98 is fastened another roller 95 having a diameter slightly greater than the diameter of roller 99. Roller 95 is frictionally driven by a disc 90 rotatably mounted on shaft 21 and driven thereby through a friction clutch assembly consisting of two collars 92 and 93 securely fastened to shaft 21, a steel washer 89, and compressible washers 91 of suitable friction material. Pressure on the friction material 91 may be adjusted by means of screws 94 in collar 93 pressing against steel washer 89. Since roller 95 is slightly larger than roller 99, disc 103 tends to run slightly slower than disc 90.

Fastened to and supported by shaft 98 is a flywheel 100 which is provided with a friction brake consisting of a brake shoe 101 supported by a shaft 110. A lever 102 secured to shaft 110 provides a means of applying brake pressure to the flywheel 100. Shaft 98 is supported in anti-friction bearings 96 at the end of a flat leaf spring 109 which is supported at its other end on some suitable portion 97 of the clutch housing by bolts 108 as shown in detail in Fig. 5. The purpose of spring 109 is to apply sufficient pressure to obtain substantially positive drive between roller 95 and disc 90 and between roller 99 and disc 103.

The operation of the embodiment of Fig. 4 is the same as that of Fig. 1 except that in Fig. 4 the speed ratio slightly different from unity is produced by means of friction discs and rollers instead of gears. The flywheel 100 is operatively connected with disc 103 through a drive means such that the flywheel runs at a considerably higher speed. This allows a much smaller flywheel to be used since the kinetic energy of a flywheel is proportional to the square of its speed.

The embodiment of Fig. 4 has improved operation for certain applications due to the brake 101 by which the speed of control disc 103 can be further controlled. For example when the clutch is applied to a motor vehicle, the manual application of the brake 101 retards the engagement of the clutch 42 to permit finer control of the vehicle speed, as for instance in parking or backing out of a garage. Since the brake 101 is required to control only the small amount of power for driving the pilot member (disc 103), very much less manual effort is required than to operate the clutch directly by manual means as is done in present commercial automobiles.

In the description of the mechanism of Fig. 1, it was pointed out that "if output shaft 51 is slower than control member 53, the differential or net effect will be to further engage clutch 42." It is further true that if output shaft 51 is faster than control member 53, the effect will be to disengage clutch 42. From this it can be seen that the screw has algebraically added the effects of two separate motions to produce a third motion proportional to the algebraic sum of the two motions. This ability to combine or "add up" two motions is better known in connection with the gear type differential such as used in the rear-end drive of motor vehicles. The screw structure shown nevertheless has true differential action for a limited range of displacement. In applying my invention, any suitable type of differential mechanism could be used, but the screw type shown has some practical advantages.

For convenience, the description of my invention has been made in connection with a clutch of the friction type. It is of course evident that my invention resides primarily in a control for a clutch rather than in the clutch itself.

All of the embodiments of my invention have an inherent stabilizing effect which tends to reduce or prevent the chattering and grabbing which sometimes occurs in simple mechanical clutches. This stability is due to the fact that when a condition of extra high friction between the friction plates occurs momentarily and accelerates the output shaft excessively, the resulting increased rotation of the output shaft immediately reduces the plate pressure.

Although but a few embodiments of my invention have been illustrated and described, it will be apparent to those skilled in the art that various changes and modifications may be made therein without departing from the spirit of the invention or from the scope of the appended claims.

What I claim and desire to obtain by United States Letters Patent:

1. Automatic means for controlling the resistance to slipping of a rotary power-transmitting unit, said power-transmitting unit having an input member, an output member, and a movable member for adjusting said resistance, said automatic means comprising a first rotatable member, a second rotatable member, differentially-acting means for coupling said two rotatable members and said movable member whereby the effects of rotation of said rotatable members in certain senses are algebraically additive to increase said resistance and whereby the effects of rotation of said two rotatable members in senses opposite said certain senses are algebraicly additive to decrease said resistance, means for driving said first rotatable member in accordance with said output member in a sense tending to decrease said resistance, a flywheel operatively associated with said second rotatable member, and auxiliary slippable drive means for driving said second rotatable member from said input member in a sense tending to increase said resistance so that extremely high accelerations of said input member cause relatively low accelerations of said second rotatable member due to the slipping of said slippable drive means and the inertia of said flywheel, said auxiliary slippable drive means having a drive ratio so that when said input member has negligible acceleration for a relatively long interval of time the speed of said second rotatable member becomes such as to cancel the resistance-decreasing effect of rotation of said first rotatable member for a certain extremely small magnitude of slip of said rotary power-transmitting unit greater than zero.

2. The invention of claim 1 characterized in that means is provided for altering the resistance to slipping of said auxiliary slippable drive means in order to further control the acceleration of said second rotatable member.

3. The invention of claim 1 characterized in that additional control means is provided for causing the resistance to slipping of said rotary power-transmitting unit to become very large for any relative speed of rotation of said input member and said output member.

4. The invention of claim 1 characterized in that one-way clutch means is operatively interposed between said second rotatable member and said input shaft to de-celerate said second rotatable member quickly when said input shaft de-celerates quickly.

5. The invention of claim 1 characterized in that said differentially-acting means is a screw and nut device whereby relative axial motion of said screw and nut in response to relative rotation of said screw and nut causes movement of said movable member for adjusting said resistance.

6. Automatic means for controlling the resistance to slipping of a rotary power-transmitting unit, said unit having an input shaft and an output shaft and a movable member for adjusting said resistance, said automatic means comprising a first screw means concentric with said output shaft and driven thereby, a second screw means engaging said first screw means whereby relative rotation of said two screw means causes relative axial motion of said two screw means, coupling means for moving said movable member in response to said relative axial motions, and means for variably driving said second screw means from said input shaft.

7. The invention of claim 6 characterized in that said means for variably driving said second screw means comprises a flywheel, an auxiliary slippable drive means for operatively coupling said flywheel to said input shaft, and means for operatively coupling said second screw means to said flywheel.

8. Automatic means for controlling the resistance to slipping of a rotary power unit, said unit having an input shaft and an output shaft and a movable member for adjusting said resistance, said automatic means comprising a first screw means on one of said shafts and driven by one of said shafts, a second screw means engaging said first screw means whereby relative rotation of said two screw means causes relative axial motion of said two screw means, coupling means for moving said movable member in response to said relative axial motion, and means for driving said second screw means from the other of said shafts.

9. Automatic means for controlling the resistance to slipping of a rotary power-transmitting unit in accordance with a piloting member rotatable at an independently controllable speed, said unit comprising an input member, an output member for driving a load, and a movable member for adjusting said resistance, said automatic means comprising a differentially-acting control means for coupling said output member and said piloting member to said movable member whereby the effects of rotation of said output member and of rotation of said piloting member are algebraicly additive to change said resistance, the normal rotation of said output member when driven by said resistance being such as to decrease said resistance and the normal rotation of said piloting member being such as to increase said resistance, whereby said resistance to slipping is continually adjusted so that said output member is caused to rotate in accordance with said piloting member.

10. The invention of claim 9 characterized in that said piloting member is driven from said input member through a shock-absorbing filter.

11. In an automatic friction clutch having an input shaft and an output shaft, a control member rotatable about said output shaft and adapted to control the engagement of said clutch, internal threads within a portion of said member, external threads on a portion of said output shaft, said internal and external threads cooperating to move said member along said output shaft to increase the engagement of said clutch when the rotative speed of said member is greater than the speed of said output shaft and to decrease the engagement of said clutch when the speed of said member is less than the speed of said output shaft, drive means for driving said member from said input shaft at a speed normally slightly less than the speed of said input shaft, a flywheel associated with said control member to increase the inertia thereof, and a torque-limiting device associated with said drive means and operative in conjunction with said flywheel to limit the acceleration of said member and consequently to limit the rate of engagement of said clutch.

12. In an automatic friction clutch having an input shaft and an output shaft, a control member rotatable about said output shaft and adapted to control the engagement of said clutch, differential means interposed between said member and said output shaft whereby said member increases the engagement of said clutch when the rotative speed of said member is greater than the speed of said output shaft and whereby said member decreases the engagement of said clutch when the rotative speed of said member is less than the speed of said output shaft, drive means for driving said member from said input shaft at a speed normally slightly less than the speed of said shaft, torque-limiting means associated with said drive means, and an inertia device associated with said member and operative in conjunction with said torque-limiting means to limit the acceleration of said member and consequently to limit the rate of engagement of said clutch when the speed of said input shaft is changed.

13. In an automatic friction clutch having an input shaft and an output shaft, a control member adapted to control the engagement of said clutch, internal threads within a portion of said control member, an intermediate member rotatably supported on said output shaft between said control member and said shaft, external threads on a portion of said intermediate member, said internal and external threads cooperating to move one of said members along said output shaft to increase the engagement of said clutch when the rotative speed of said control member is greater than the speed of said intermediate member and to decrease the engagement of said clutch when the speed of said control member is less than the speed of said intermediate member, a first drive means for driving said intermediate member from said output shaft at a speed normally slightly greater than the speed of said shaft, a second drive means for driving said control member from said input shaft, a flywheel associated with said control member to increase the effective inertia thereof, and a torque-limiting means associated with said second drive means and operative in conjunction with said flywheel to limit the acceleration of said control member and consequently to limit the rate of engagement of said clutch.

14. In an automatic friction clutch having an input shaft and an output shaft, a control member rotatable about said output shaft and adapted to control the engagement of said clutch, internal threads within a portion of said member, external threads on a portion of said output shaft, said internal and external threads cooperating to move said member along said output shaft to increase the engagement of said clutch when the rotative speed of said member is greater than the speed of said output shaft and to decrease the engagement of said clutch when the rotative speed of said member is less than the speed of said output shaft, an auxiliary shaft, means for driving said member from said auxiliary shaft at a first speed ratio, means for driving said auxiliary shaft from said input shaft at a second speed ratio, said speed ratios being such that the rotative speed of said member is normally slightly less than the speed of said input shaft, a flywheel associated with said auxiliary shaft, and torque-limiting means interposed between said input shaft and said flywheel and operative in conjunction with said flywheel to limit the acceleration of said member and consequently to limit the rate of engagement of said clutch.

15. In an automatic friction clutch having an input shaft and an output shaft, a control member rotatable about said output shaft and adapted to control the engagement of said clutch, an intermediate member rotatably supported on said output shaft between said control member and said shaft, differential means interposed between said control member and said intermediate member whereby said control member increases the engagement of said clutch when the rotative speed of said control member is greater than the speed of said intermediate member and whereby said control member decreases the engagement of said clutch when the rotative speed of said control member is less than the speed of said intermediate member, a first drive means for driving said intermediate member from said output shaft at a speed normally slightly greater than the speed of said shaft, a second drive means for driving said control member from said input shaft, torque-limiting means associated with said second drive means, and an inertia device associated with said torque-limiting means to limit the acceleration of said control member and consequently to limit the rate of engagement of said clutch when the speed of said input shaft is changed.

16. In a rotary power clutch having a first clutch member, a second clutch member, and a clutch engaging member adapted to engage and disengage said clutch members to vary the driving connection therebetween, a pilot member, means for driving said pilot member from said first clutch member, said means including a torque-limiting device and an inertia device for limiting the acceleration of said pilot member when the speed of said first clutch member changes abruptly, and a three-element differential means operatively interposed between said pilot member, said second clutch member, and said clutch engaging member, whereby the driving connection between said clutch members is varied in accordance with the algebraic sum of the rotation of said second clutch member and of said pilot member.

17. In a power transmission system, an input shaft, an intermediate shaft, an output shaft, a variable speed transmission interposed between said input shaft and said intermediate shaft, an automatic friction clutch interposed between said intermediate shaft and said output shaft, a control member rotatably mounted on said output shaft and adapted to control the engagement of said clutch, differential means interposed between said control member and said output shaft whereby said control member increases the engagement of said clutch when the rotative speed of said member is greater than the speed of said shaft, driving means for driving said control member from said intermediate shaft at a speed ratio which is normally slightly less than unity, and an inertia device associated with said control member and operative in conjunction with said torque-limiting means to limit the acceleration of said control member and consequently to limit the rate of engagement of said clutch when the speed of said input shaft is changed.

ALDA V. BEDFORD.